(12) United States Patent
Linares (10) Patent No.: US 7,374,056 B2
(45) Date of Patent: May 20, 2008

(54) COLLAPSIBLE FREIGHT CONTAINER INCORPORATING POWDER IMPRESSION MOLDED PANELS FORMED ABOUT A THREE-DIMENSIONAL AND INTERLOCKING SKELETAL STRUCTURE AND A MOLD PROCESS FOR CREATING THE SAME

(76) Inventor: Miguel Linares, 2769 Mcintosh La., Bloomfield Hills, MI (US) 48302

( * ) Notice: Subject to any disclaimer, the term of this patent is extended or adjusted under 35 U.S.C. 154(b) by 23 days.

(21) Appl. No.: 11/319,983

(22) Filed: Dec. 28, 2005

(65) Prior Publication Data

US 2006/0144837 A1 Jul. 6, 2006

Related U.S. Application Data

(60) Provisional application No. 60/640,613, filed on Dec. 30, 2004.

(51) Int. Cl.
*B65D 88/00* (2006.01)
(52) U.S. Cl. ............................................. 220/1.5
(58) Field of Classification Search ............... 220/1.5, 220/6; 114/26, 72; 264/274
See application file for complete search history.

(56) References Cited

U.S. PATENT DOCUMENTS

| | | | |
|---|---|---|---|
| 3,481,503 A | 12/1969 | Kloess et al. | |
| 3,563,403 A * | 2/1971 | Luisada et al. | 220/1.5 |
| 3,570,698 A | 3/1971 | Dougherty | |
| 3,877,602 A | 4/1975 | Clark et al. | |
| 4,214,669 A | 7/1980 | McQuiston | |
| 4,506,798 A | 3/1985 | Goutille | |
| 4,693,386 A | 9/1987 | Hughes et al. | |
| 4,848,618 A * | 7/1989 | Yuan et al. | 220/1.5 |
| 4,993,125 A * | 2/1991 | Capron et al. | 24/287 |
| 5,190,179 A | 3/1993 | Richter et al. | |
| 5,450,977 A * | 9/1995 | Moe | 220/592.09 |
| 5,601,202 A | 2/1997 | Meacham et al. | |
| 5,865,334 A | 2/1999 | Ruiz et al. | |
| 2002/0017070 A1* | 2/2002 | Batch | 52/309.11 |
| 2002/0100548 A1* | 8/2002 | Minami et al. | 156/299 |

* cited by examiner

*Primary Examiner*—Anthony D. Stashick
*Assistant Examiner*—Harry A Grosso
(74) *Attorney, Agent, or Firm*—Gifford, Krass, Sprinkle, Anderson & Citkowski, P.C.

(57) ABSTRACT

A collapsible cargo carrying enclosure including a plurality of panels, each exhibiting a specified two-dimensional shape and thickness and which are interconnected along adjoining edges. Each of the panels exhibits a structural substrate, over which is molded a plasticized material. The structural substrate typically includes a network of elongated and interconnecting bamboo, steel or aluminum members, the plasticized material further including a powder impression material filling said mold within which an aggregate is entrained including at least one of glass, pebbles/rocks, ceramics, steel rerods and wood. The panels are interconnected together and collapsible in a stacked manner to provide the advantages of lightweight and ease of shipment. The assembled container further defines a waterproof and floatable/towable cargo holding enclosure, such as for use offshore offloading and transport of cargo shipments.

15 Claims, 7 Drawing Sheets

COLLAPSIBLE FREIGHT CONTAINER INCORPORATING POWDER IMPRESSION MOLDED PANELS FORMED ABOUT A THREE-DIMENSIONAL AND INTERLOCKING SKELETAL STRUCTURE AND A MOLD PROCESS FOR CREATING THE SAME

CROSS REFERENCE TO RELATED APPLICATIONS

The present application claims the priority of U.S. Provisional Patent Application Ser. No. 60/640,613, filed Dec. 30, 2004, and entitled "Collapsible Freight Container Incorporating Powder Impression Molded Panels Formed About a Three Dimensional and Interlocking Skeletal Structure and a Mold Process for Creating the Same."

BACKGROUND OF THE INVENTION

1. Field of the Invention

The present invention discloses a freight container and, more particularly, a collapsible cargo container constructed of a series of interconnected and powder impression molded panels. Each of the panels are formed about an interlocking skeletal structure associated with a side, end, top or bottom panel. The panels are typically hinged together and are collapsible in a stacked manner which provides the advantages of lightweight and ease of shipment. The assembled container further defines a waterproof and floatable/towable cargo holding enclosure, such as for use offshore offloading and transport of cargo shipments.

2. Description of the Prior Art

The prior art is well documented with various examples of shipping container devices. These typically exhibit a standardized, six-sided configuration and, in a number of variants, are capable of being collapsed or reduced in size when not in use and in a desire to provide desired space savings during transport or storage.

U.S. Pat. No. 3,877,602, issued to Clark, teaches a collapsible container with improved fastener assemblies and which is formed from a plurality of lightweight, insulating panel members each detachably secured together along their respective edges by fastener assemblies, such further including a stud formed of a synthetic plastic material and a stud receiving element formed of a softer synthetic plastic material to lock the stud in a fully fastened condition. A pallet, associated with a fully loaded container, serves as a skid in receiving the disassembled panel members in a knocked down, nested condition.

A further example is set forth in U.S. Pat. No. 5,865,334, issued to Ruiz et al., and which teaches a self-contained, six-sided, reusable container for goods and including both an assembled form and a collapsed form. In the collapsed configuration, the ends and sides are stored between a sandwiching top and bottom. In the preferred embodiment, the ends are hinged to the bottom and fold inwardly thereupon. The sides and ends are interconnected while the container is in its assembled form, such as by utilizing an attachable corner hook latching mechanism.

U.S. Pat. No. 5,190,179, issued to Richter, teaches a collapsible box-type, waterproof shipping container including pivoting end walls and bi-folding side walls. The end walls pivot inwardly of the container to lie on its base, the side walls folding longitudinally to lie upon the end walls. In this fashion, the side and end walls are enclosed within the base structure when collapsed, and the top wall completely seals the side and end walls from the exterior.

U.S. Pat. No. 4,214,669, issued to McQuiston, teaches an elongated and box-like cargo container and by which its end walls can be pivoted longitudinally inwardly and downwardly to collapsed horizontal positions atop the bottom walls. The side walls each include hingedly connected upper and lower panels and are likewise capable of being pivoted inwardly to horizontally collapsed positions relative to a base and between the top wall and end walls.

U.S. Pat. No. 3,570,698, issued to Dougherty, teaches a collapsible rectangular shipping container having opposed horizontally-hinged sidewalls which can be collapsed or folded inwardly and downwardly to allow the top and bottom walls to sandwich together. Further included are folding ends which fold over in order to cover the collapsed structure.

Additional references of note include Hughes, U.S. Pat. No. 4,693,386, which teaches a collapsible shipping container having a rectangular base and four side walls pivotally attached thereto and foldable from an erect configuration to a collapsed condition. Captive fastener means on the walls are operated to interconnect in the erected condition. The entire shipping container is constructed of plastic material without the inclusion of any metal parts.

Finally, U.S. Pat. No. 5,601,202, issued to Meachem et al., teaches a transport container having a base and a plurality of side walls perpendicularly connected to form a container having an inner cavity. The side walls are formed of first and second wall panels hingedly connected so that first or upper wall panels may fold down relative to second or lower wall panels to collapse the transport container after use. The first and second wall panels are hingedly connected by an elongated flexible hinge. Edge portions of the first walls panels further include coupling assemblies that are designed to selectively connect and disconnect adjacent first wall panels.

SUMMARY OF THE PRESENT INVENTION

The present invention discloses a collapsible cargo container constructed of a series of interconnected and powder impression molded panels. Each of the panels are formed about an interlocking skeletal structural substrate associated with a side, end, top or bottom panel, over which is molded a plasticized material.

The structural substrate typically includes a network of elongated and interconnecting bamboo, steel or aluminum members, the plasticized material further including a powder impression material filling said mold within which an aggregate is entrained including at least one of glass, pebbles/rocks, ceramics, steel rerods and wood. The panels are interconnected together and collapsible in a stacked manner to provide the advantages of light weight and ease of shipment.

Upon assembly, the panels are hingedly connected together to define the desired six-sided and cargo carrying interior. In particular variants, the assembled container may be supported upon a buoyant freight barge or may include overlapping and biasingly sealed profile edges, this further defining a waterproof and floatable/towable cargo holding enclosure such as for use offshore offloading and transport of cargo shipments.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
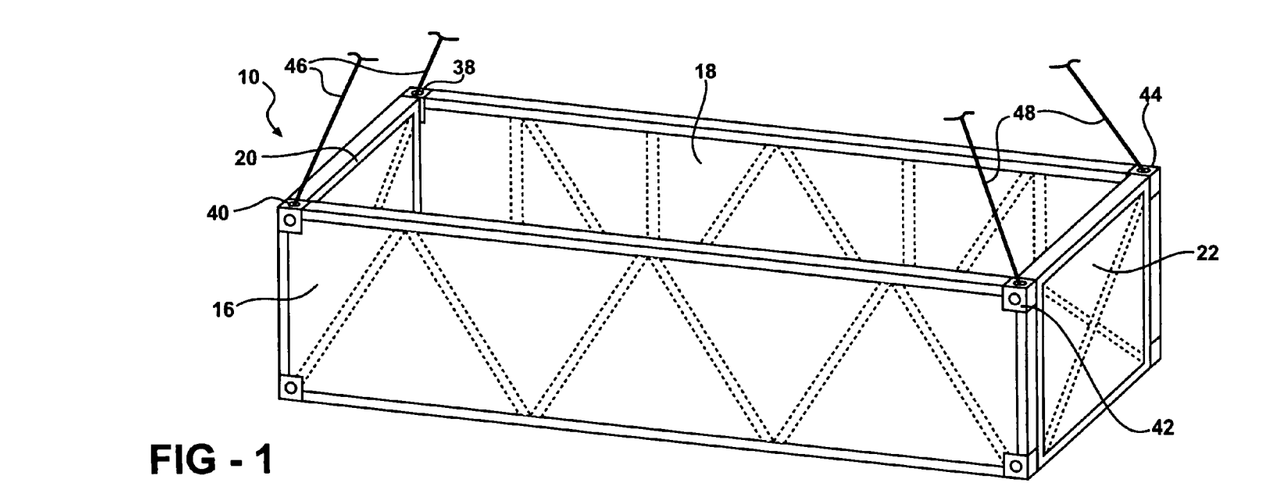
FIG. 1 is a perspective view, with top cutaway, of a freight container according to a preferred embodiment of the present invention.

Referring now to FIG. 1, a perspective view is illustrated at 10, with top cutaway, of a freight container according to a preferred embodiment of the present invention. As described previously, the present invention discloses a lightweight, durable, environmentally resistant and collapsible cargo container and which, as will be subsequently described, is capable of shipping goods by air, land or sea.

Figure 8:
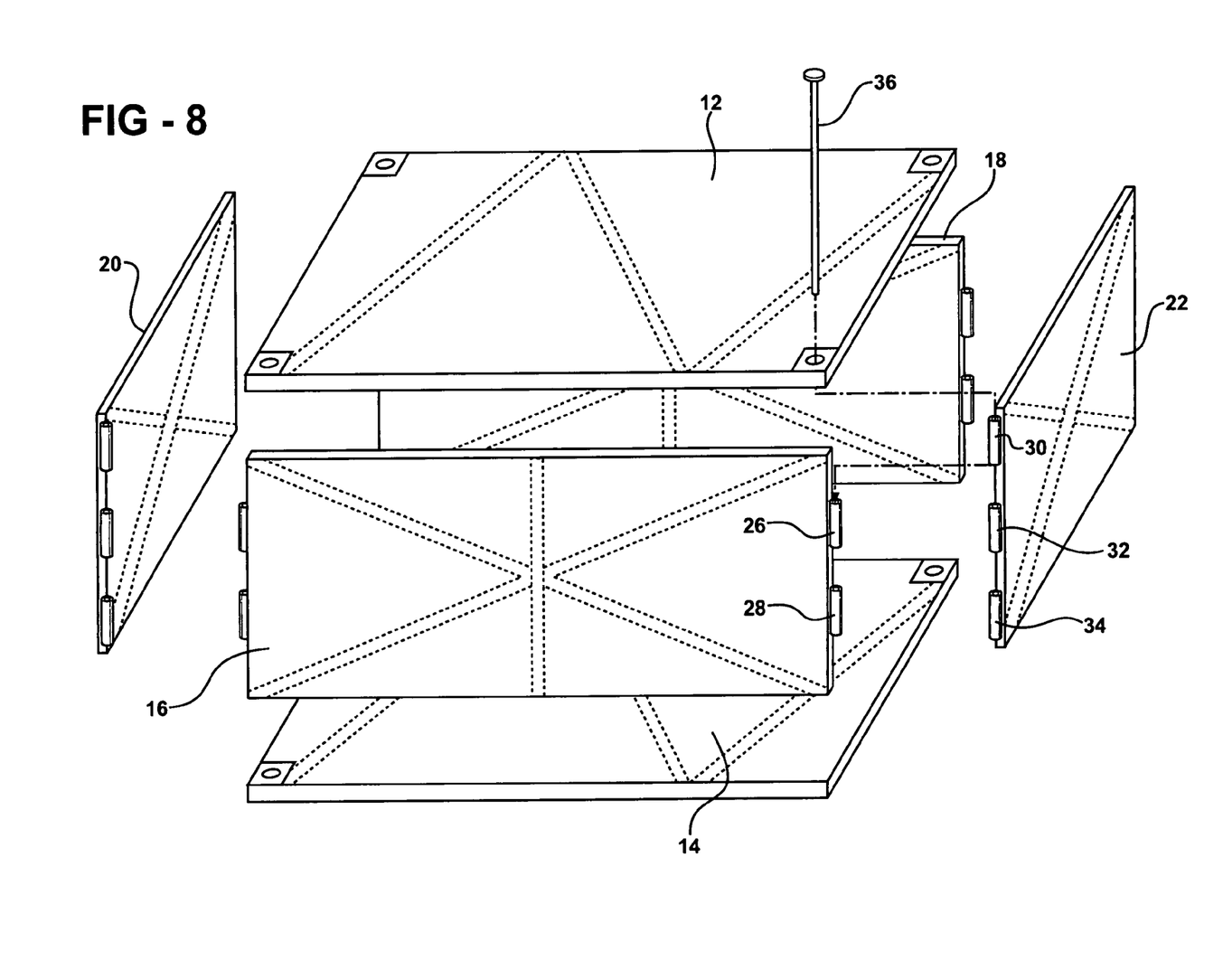
FIG. 8 is an exploded view of a shipping container and illustrating its substantially rectangular and three-dimensional configuration.

In a preferred embodiment, the cargo container exhibits a three-dimensional, typically rectangular and six-sided configuration. As best shown in FIG. 8, the container includes a top 12, a bottom 14, first and second sides 16 and 18, and first and second ends 20 and 22. It is also envisioned that, while a six-sided container configuration is optimal, container configurations of other shapes can be incorporated without deviating from the scope of the invention. Although not clearly illustrated, it is understood that a suitable end panel 20 or 22 doubles as an openable/closable container door and which may include any necessary manner of fastener structure necessary for locking or unlocking the associated panel relative to the remaining panels making up the assembleable structure.

In an initial preferred embodiment, each of the panels is constructed of a powderized thermoplastic resin which is injection molded into a closed mold, usually at a relatively low temperature and such as with the addition of a suitable (aggregate) reinforcing material. In one desired application, the impression molded construction may include spaced apart outer layers constructed of a first harder and waterproof material. (such as a polyurethane), combined with an inner foamable, insulating and structurally contributing material within which is entrained the desired structural substrate, filler and aggregate materials. The resultant plastic composite material exhibits properties comparable to those of steel, often at one-third of the comparable weight of a similarly sized steel structure.

The injection molded process is further suitable for the production of larger sized parts and structures and offers fundamental benefits for reducing the costs of molding. Aggregate materials such as glass, pebbles/rocks, ceramics, steel rerods, wood, and the like may be incorporated into the PIM (powder impression molding) matrix composition. It is also contemplated that other and additional low cost and locally available materials, such as recycled rubber or hay may be employed to produce the structurally assembleable components.

Figure 4:
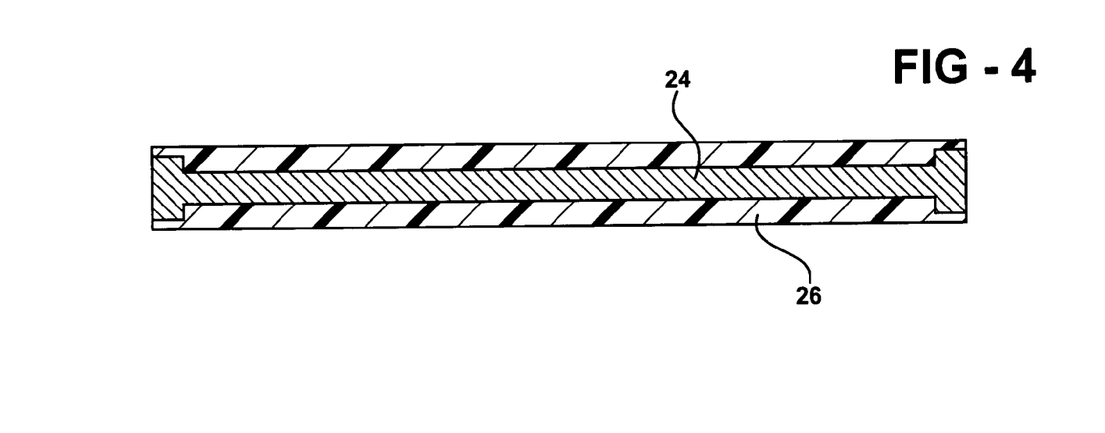
FIG. 4 is a cutaway view taken along line 4-4 of FIG. 2 and illustrating the encapsulating nature of the plastic molded layer about the structural substrate.

As is further shown throughout the several views, each of the panels includes a substrate skeletal structure about which is encapsulated the plasticized material. Such substrate components include, without limitation, bamboo, steel, aluminum or other suitable members, typically elongated and interconnected in some fashion in order to create a strong, yet lightweight structure about which is molded the associated plasticized panel. Reference is specifically made to the cutaway view of FIG. 4 and which shows a representative structural element 24 encapsulated within a layer of powderized impression molded (PIM) plastic.

The resultant panels created each exhibit the necessary properties of strength and durability necessary for supporting and transporting items of freight. According to the initial embodiment illustrated, the panels 12-22 may be connected together hingedly through the use of alternating, spaced apart and aligning sleeves, and such as is referenced in FIG. 8 by sleeve portions 26 and 28 in side 16 and which mate in linearly extending fashion with offset and spaced apart sleeve portions 30, 32 and 34 in side 22.

One or more elongated pins 36 are provided and insert through the aligning sleeve portions in order to secure the side and end panel together at the prescribed locations. As will be described in succeeding embodiments, it is also envisioned that other types of interengaging structure can be employed for connecting together the various panels, such including the use of bolt fasteners, molded end brackets screwed together into adjoining edge locations of the panels, biasingly and sealingly interconnecting and overlapping extending edges associated with the individual panels, and the like.

A series of line supporting eyelets are located in proximity to the four corners of the top panel 12 and such as which are identified at 38, 40, 42 and 44. Ropes 46 and 48 are provided (see FIG. 1) and which engage through the eyelets 38-44 to provide for lifting and moving of the assembled cargo containers.

Figure 2:
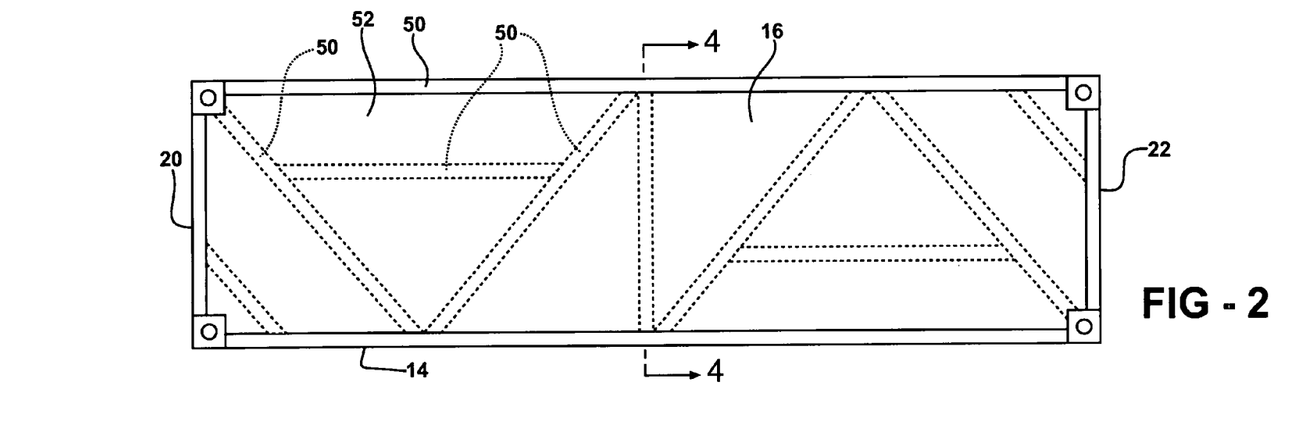
FIG. 2 is a side plane view of the freight container of FIG. 1.
Figure 3:
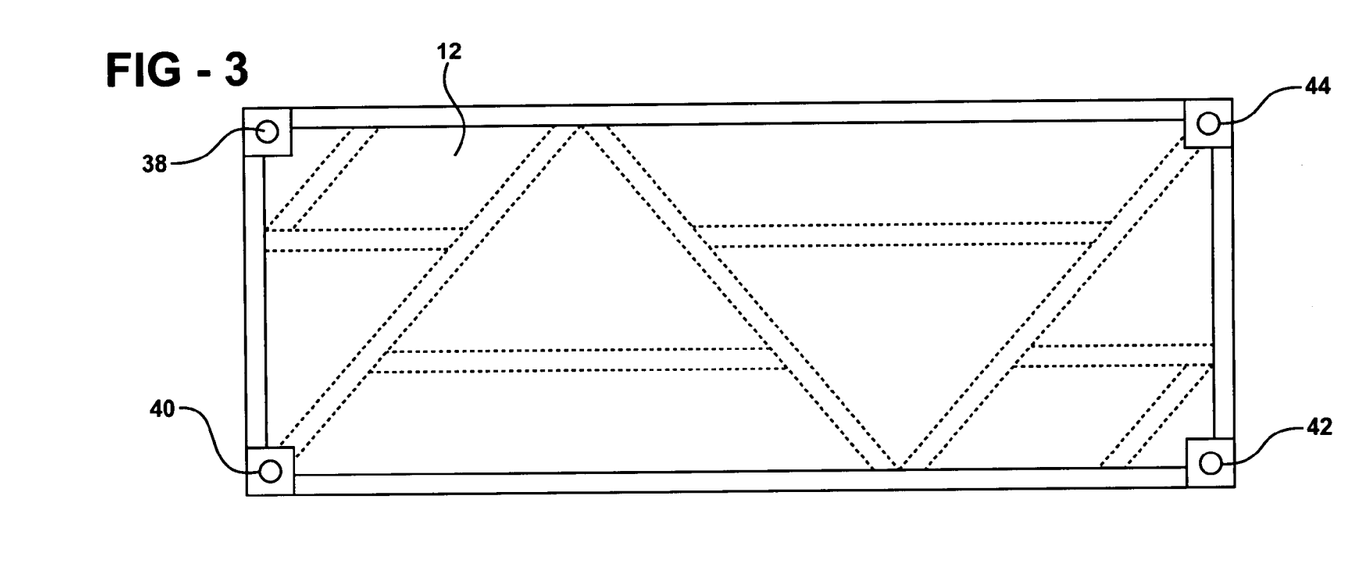
FIG. 3 is a two-dimensional top view of the freight container and again illustrating the features of the lift-supporting eyelets defined at the uppermost corners of the container.

FIG. 2 is a side plane view of the freight container of FIG. 1 and illustrating a further representative arrangement of interlocking structural components (see at 50) about which is over-molded a plasticized (PIM) layer of material 52 according to a specified thickness. It is envisioned that the individual panels of material can be formed with a relative thickness of between an inch, and up to several inches thick depending upon the overall length and width of the panels and depending upon their cargo carrying rating. Such cargo carrying structures can exhibiting overall lengths including six, twelve, twenty, thirty, forty feet, etc., as well as corresponding widths ranging from four, six, eight, ten feet, etc.

Figure 5:
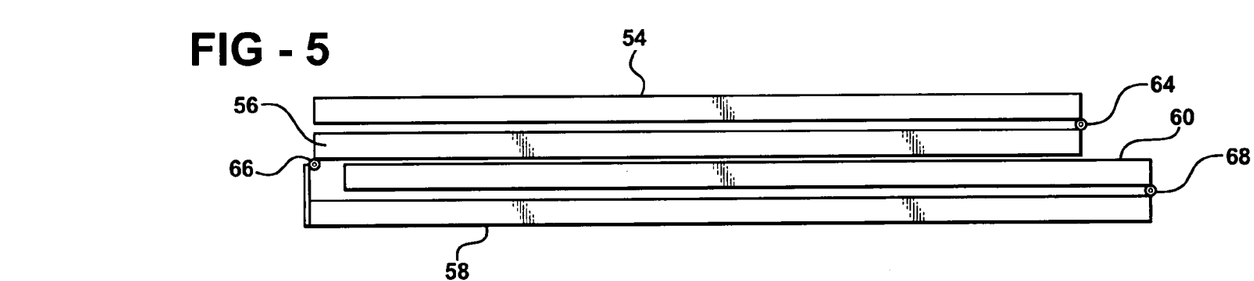
FIG. 5 is a collapsed side view of a four-sided and hingedly connected container portion including top, sides and bottom and according to a shipping variant of the present invention.
Figure 6:
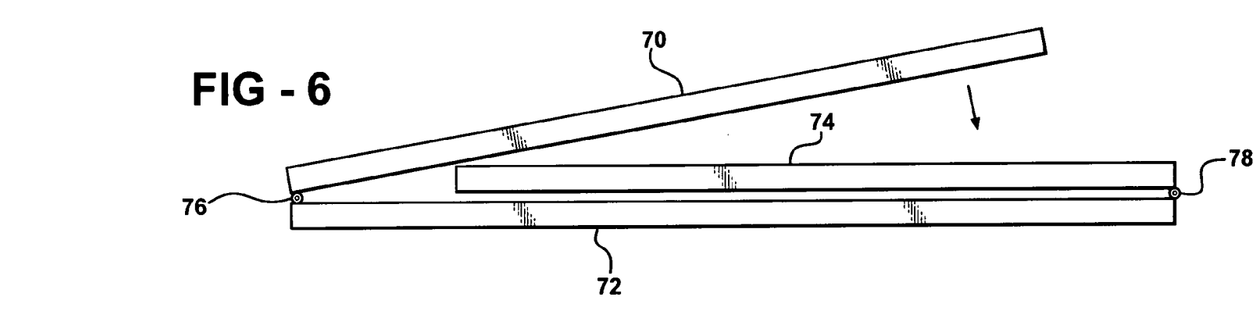
FIG. 6 is a succeeding illustration of a three-sided and hingedly collapsible portion of shipping container according to the present invention.
Figure 7:
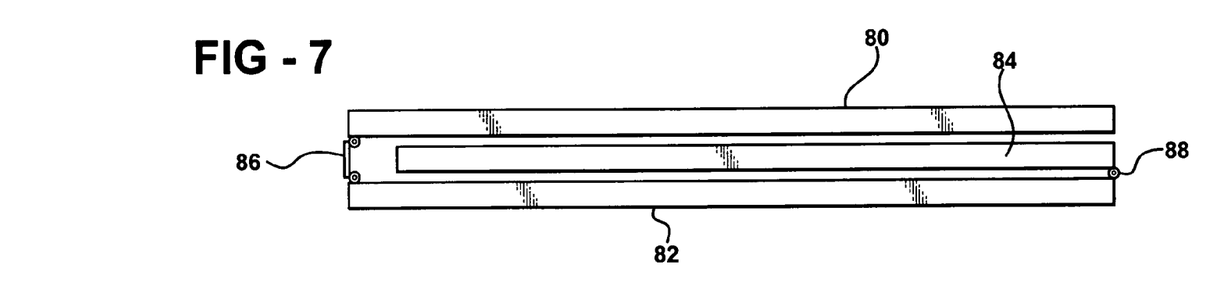
FIG. 7 is a similar illustration of another three-sided variant of a hingedly interconnected and collapsible container.

Referring to each of FIGS. 5-7, collapsed side views are illustrated of either three or four-sided and hingedly connected container portions, the purpose for which being to illustrate one possible manner in which the containers are capable of being collapsed to a substantially flattened and reduced area in order for them to be shipped from one location to another, prior to reassembly and use. As first shown in FIG. 5, the collapsed side view includes reference to a top 54, first side 56, bottom 58 and second side 60, each hingedly connected together.

Not illustrated in FIG. 5 are the provision of the end panels (such as shown at 20 and 22 in FIG. 8), it being understood that these are capable of being separately shipped or hingedly connected to any of the top, bottom or side panels. As previously described, the use of hinges, shown at 62, 64, 66 and 68 in FIG. 5, and while comprising a preferred embodiment, can again be substituted by other structure for securing together the individual panels or, alternatively, be omitted in favor of other types of mechanical fasteners or fluid-tight sealing constructions defined such as along overlapping edges of the individual and assembleable panels.

Referring again to FIG. 6, a succeeding illustration of a three-sided and hingedly collapsible portion of shipping container according to the present invention and which includes sides 70, 72 and 74 interconnected by hinges 76 and 78. A similar illustration of a further three-sided variant of a hingedly interconnected and collapsible container is illustrated in FIG. 7 by sides 80, 82 and 84, hingedly connected at locations 86 and 88. It is envisioned that the pair of three-sided components of FIGS. 6 and 7 can be hingedly interconnected and in order to construct a six-sided and rectangular overall configuration.

It is also envisioned that any other number of panels can be employed in hinged or otherwise interconnecting fashion and in order to achieve other three-dimensional cargo carrying enclosures, such including triangular, five-sided, hexagonal, octagonal and other multi-sided enclosures. It is further envisioned that one or more selected panels can be formed in an arcuate extending pattern, such including a cylindrical or semi-cylindrical shape, and in order to provide a sleeve or tube carrying enclosure for specific cargo items.

An associated mold process for creating a collapsible cargo carrying enclosure includes the steps of positioning a framework of interconnecting structural components within a mold cavity, filling the mold interior with a powder impression molding material encapsulating thereabout the structural components, and curing and removing a panel corresponding to the impression molded material. Additional process steps include forming at least one connecting location, either hingedly or in biasing interconnecting fashion as will be subsequently described, along adjoining edges associated with first and second interconnecting panels.

Also included is the step of intermixing an aggregate with the powder impression material, the aggregate further selected from a group including at least one of a glass, pebbles/rocks, ceramics, steel rerods and wood. In the further instance of a hingedly assembled structure, according to any of the previous disclosed embodiments, also included is the step of forming at least one eyebolt into a top panel associated with the cargo carrying enclosure.

Figure 9:
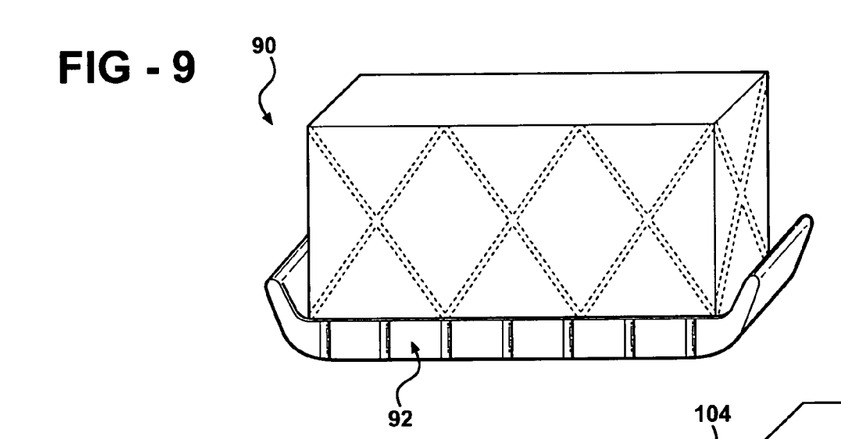
FIG. 9 is a perspective illustration of a freight container supported upon a buoyant freight barge according to a further preferred embodiment of the present invention.

Referring now to FIG. 9, a perspective illustration is generally shown at 90 of a freight container supported upon a buoyant freight barge 92, according to a further preferred embodiment of the present invention. The construction of the freight container 90 may be according to any of the previous embodiments described, or further may be constructed according to any of the embodiments to be described as follows.

Figure 10:
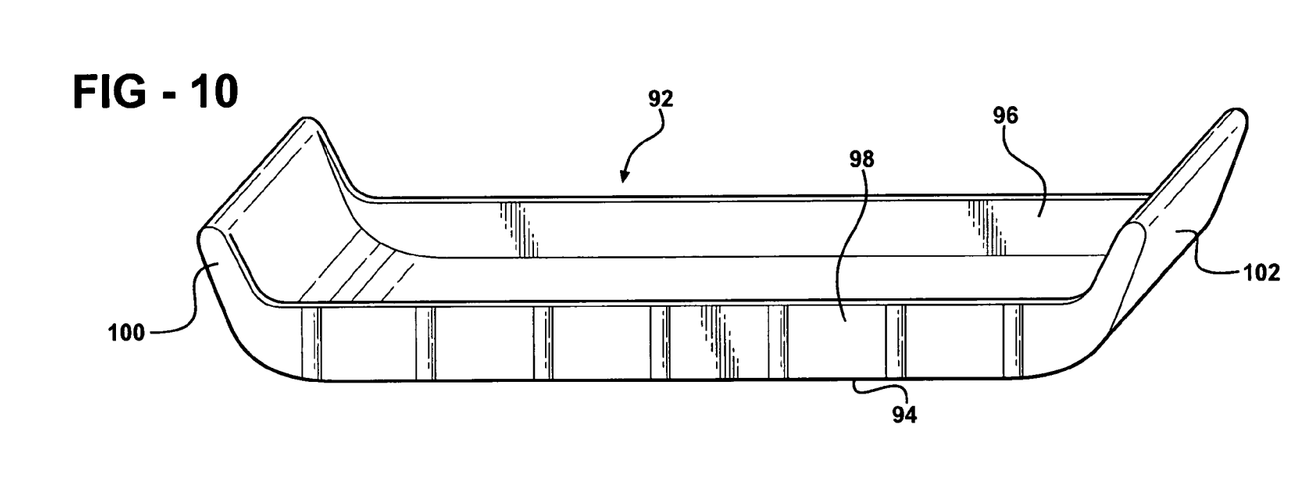
FIG. 10 is another illustration of the freight barge.

FIG. 10 provides another illustration of the freight barge and which illustrates a buoyant structure exhibiting a flat bottom 94 with upturned sides 96 and 98 and edges 100 and 102, the purpose for which being to support, in secure fashion, the cargo laden container 90 in any type of sea. It is further envisioned that the freight barge 92 can be constructed from the same PIM process as is employed in producing the container or, alternatively, can be constructed from other buoyant materials.

Additionally, and although not shown, it is understood that the inner surfaces of the flatbed barge 92 may include centering protrusions extending from the inner surface of the flat bottom, such as for gripping about the outer edges of the container. Additional components, such as including clips, straps or other types of restraining harnesses, can additionally or alternatively be provided for preventing the container 90 from shifting during on the water transport of the barge 92.

Figure 11:
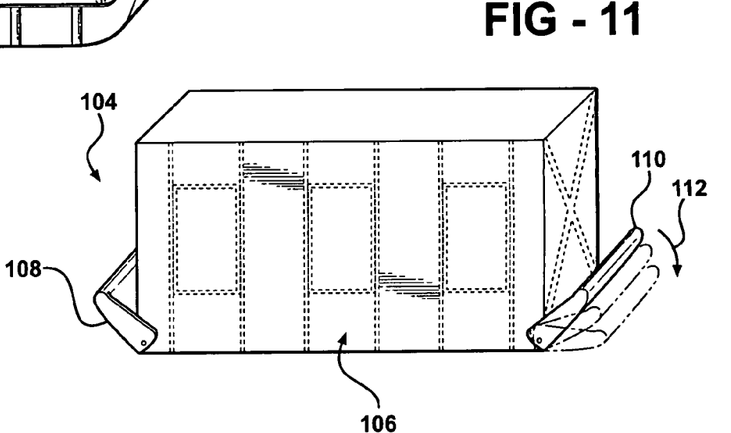
FIG. 11 is a perspective illustration of a freight container supported upon a buoyant freight barge according to a further proposed variant, and by which extending ends thereof are pivotally repositionable to adjust its floating characteristics.

Referring now to FIG. 11, a perspective illustration is shown at 104 of a freight 5 container supported upon a buoyant freight barge 106 according to a further proposed variant. In particular, extending ends 108 and 110 of the freight barge 106 are capable of being pivotally repositioned, see in multiple phantom fashion as referenced at 112 in FIG. 11, and in order to adjust the floating characteristics of the barge 106.

It is desirable in the embodiment illustrated to be able to pivot the ends of 108 and 110 of the flat bottom freight barge 106, such as to enable the on-loading and off-loading one or more of the associated containers 104, as well as again to adjust the performance characteristics of the barge 104 as it is conveyed upon a waterway. As with the one-piece freight barge 92 of FIG. 9, the associated variant of freight barge 106 with flap associated ends 108 and 110 may likewise be constructed of a PIM molded material, or other suitable material, within the scope of the invention.

Figure 12:
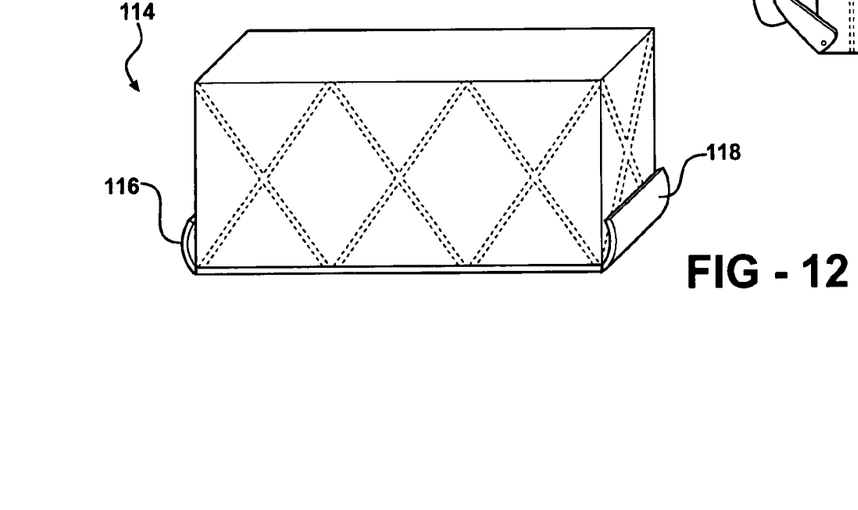
FIG. 12 is a perspective illustration of a further variant of a waterproof shipping container including integrally secured and adjustable end flaps.

Referring now to FIG. 12, a perspective illustration is shown at 114 of a still further variant of a waterproof shipping container, this again including first and second end mounted, pivotally and integrally secured, and adjustable end flaps 116 and 118. As further referenced by the enlarged sectional cutaway illustration of FIG. 13, the end flaps (see as shown at 116 in multi-position illustrated fashion 118) are capable of pivoting about a lower pivot axis (see as further shown at 120).

The container 114 of FIG. 12 may further differ from those previously described, particularly in that associated and overlapping edges extending along the container top, bottom, side and end panels are sealingly connected together, specifically in waterproof fashion. In this manner, the container 114 is capable of being buoyantly supported within the water, as shown in FIG. 12, and such as without the requirement of an associated freight barge.

Figure 14:
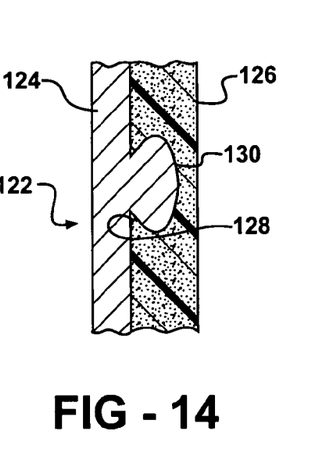
FIG. 14 is partial view illustrating a profile established by overlapping and seal-proof connecting edges, associated with each of the assembleable top, bottom, side and end panels of the freight container according to the present invention.

FIG. 14 is a partial view 122 illustrating a first example of a profile established by overlapping and seal-proof connecting edges 124 and 126, these associated with each of assembleable top, bottom, side and end panels of the freight container 122. In particular, the variant of FIG. 14 illustrates a lengthwise extending recess 128 defined within an inner facing surface of a first selected container panel, e.g. that shown at 126, and which is biasingly and sealingly engaged by a bulbous projecting and likewise extending portion (see at 130). In particular, the bulbous and axial extending portion 130 may define a biasing inner projecting portion, such as constructed of a plasticized or rubberized material molded along an inner facing surface of the PIM constructed panel, and such which, upon assembly, provides seal-tight engagement along all of the sides and ends of the container.

In this fashion, the interconnecting sections of the individual container panels are capable of being secured together in a seal-tight and waterproof fashion, and thereby to prevent water from seeping into the cargo holding interior of the container. It is further understood that the container according to this embodiment is also capable of being secured together in either a hinged or fixed assembled fashion, such as further through the provision of the individual container panels in independent and stackable form, and within the scope of the invention.

Figure 15:
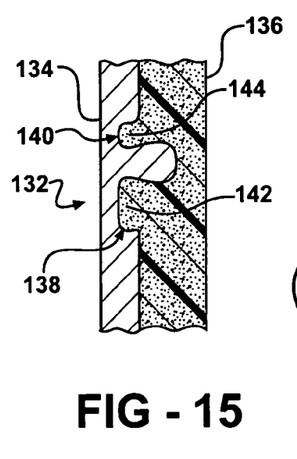
FIG. 15 is a succeeding partial view illustrating a second interengaging and seal-proof profile established between associated edges of the shipping container panels according to the present invention.

Referring further to FIG. 15, a succeeding partial view 132 illustrates a second interengaging and seal-proof profile established between likewise associated edges 134 and 136 corresponding to first and selected shipping container panels according to the present invention. In particular, the arrangement of FIG. 15 expands upon the concept previously described in FIG. 14, and by which a pair of lengthwise extending recesses 138 and 140 are defined along an inner selected surface of a selected panel 134, and which are biasingly and insertingly engaged by a projecting portions 142 and 144 associated with the opposing facing inner surface of the further selected and overlapping panel 136.

In this fashion, the assembled container panels define an even further right and seal-tight arrangement preventing the seepage of water into the container interior and which also contributes further to the structural rigidity accorded the container. It is further understood and envisioned that additional structure can be incorporated into the opposingly facing surfaces of the overlapping container panels, these including such a rubber-proofing strips or other sealant components which contribute to the water-tight nature of the assembly.

Figure 16:
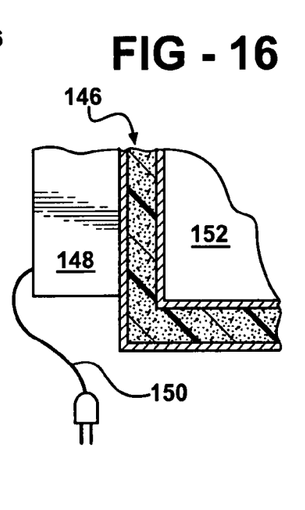
FIG. 16 is a partial cutaway view of selected container sections and illustrating an insulating characteristic established by the foamable PIM material composition.

Referencing FIG. 16, a partial cutaway view is shown at 146 of selected container sections and illustrating an insulating characteristic established by the foamable PIM material composition. It is envisioned that, as part of the cargo carrying capabilities accomplished by the container structure, certain variants of the container can operate as refrigeration compartments, and owing in part to the highly insulating characteristics of the PIM material interior.

In the variant of FIG. 16, a portable refrigeration/chiller unit 148 is illustrated secured to an exterior surface, such as a selected wall or, more preferably, a top. A power cord 150 extends from the unit 148 and plugs into such as a remote electrical power supply, and such as which may be further associated with an aircraft, truck or container ship. It is also envisioned that a suitably configured cargo container may include an onboard portable electrical supply, such as a battery, in order to chill a communicating interior, see at 152 in FIG. 16, of the container 146.

Figure 17:
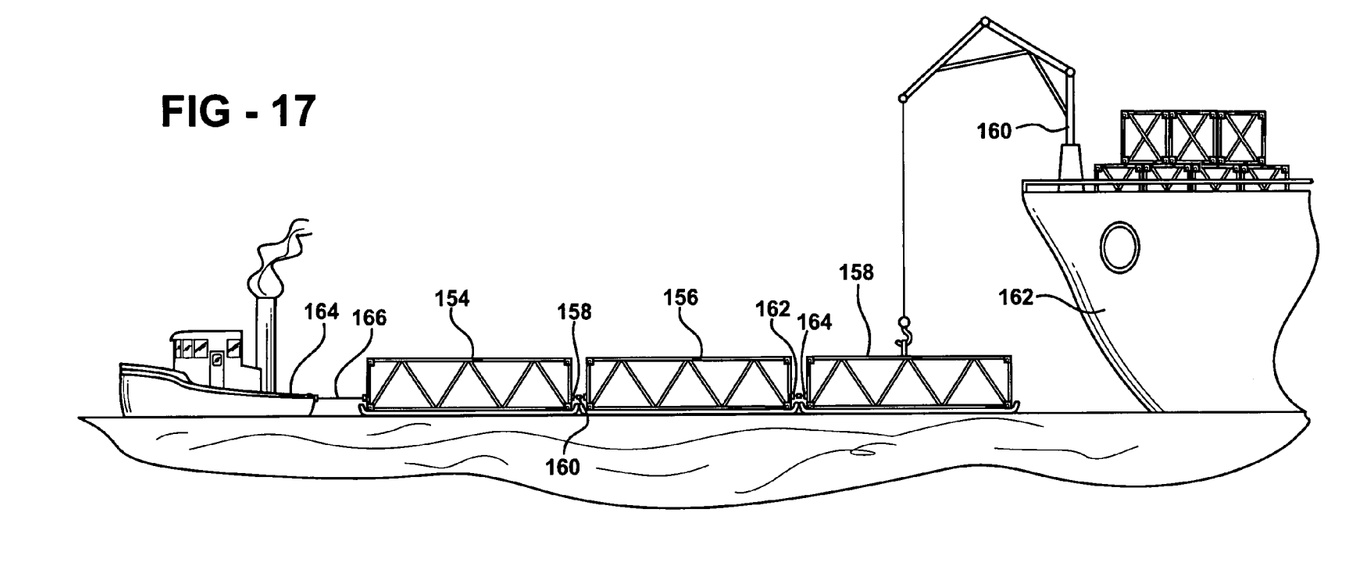
FIG. 17 is an environmental illustration of a plurality of floatable shipping containers, such as incorporating the edge sealing profiles of FIG. 13 or 14, and which are progressively offloaded at sea from such as a container ship.
Figure 18:
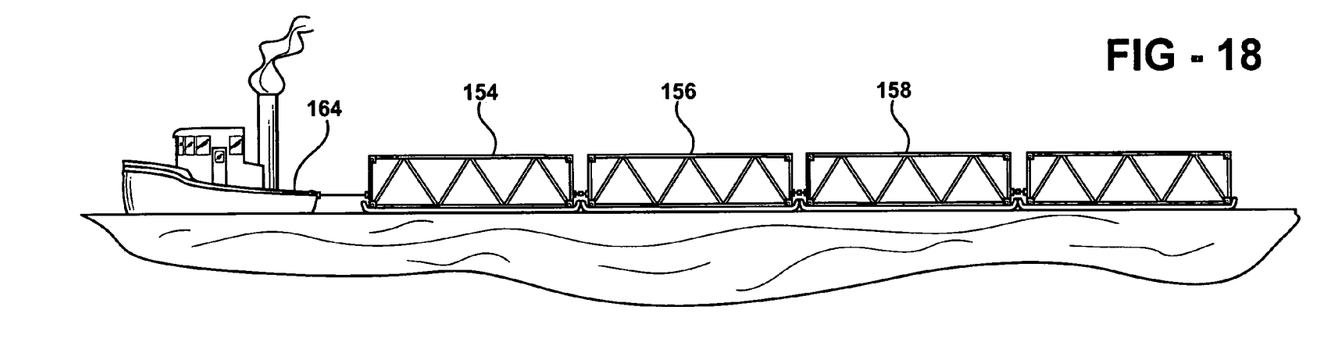
FIG. 18 is further succeeding illustration of a plurality of shipping containers as shown in FIG. 17 being towed by a smaller powered watercraft.

Referring finally to FIGS. 17 and 18, a further unique feature afforded by the container structure of the present invention, such as in particular set forth in the embodiments of FIGS. 12-15, is the ability to tow a plurality of buoyant and cargo laden containers upon a body of water. This is in particular significant in instances where a plurality of cargo supporting containers are desired to be delivered to a shore-side location, such as associated with developing countries which often possess deficient commercial harbor facilities for loading and off-loading containers from full sized container carrying ships.

Figure 13:
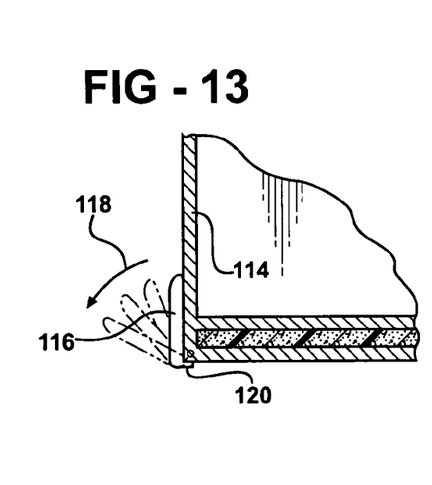
FIG. 13 is an enlarged sectional end view of the container illustrated in FIG. 12.

Referring first to FIG. 17, an environmental illustration is shown of a plurality of floatable shipping containers, 154, 156, 158, et seq., each of which incorporating the edge sealing profiles of FIG. 13 or 14, and which are progressively offloaded by a crane 160 associated with a full-sized container ship 162. A smaller sized boat 164 (such as a trawler, tug or modest sized commercial cruiser) establishes a towing sequence, see line 166, with an initial one of the containers 154.

Successive containers are connected by associated and interengaging couplings, see as further shown at 158 and 160 as established between containers 154 and 156, as well as at 162 and 164 as established between containers 156 and 158. The end interconnecting couplings, e.g. again those shown at 162/164, may be similar to those employed in use for interconnecting conventional railway cars, or may include other potential interconnecting portions including hook and ring fasteners and the like.

FIG. 18 further illustrates a greater plurality of buoyant supported shipping containers, linked together according to a procedure such as shown in FIG. 17, and again towed by the smaller designated power watercraft 164. The importance of FIG. 18 is that it illustrates the capability of a smaller sized boat, such as of modest power and likely originating from a modest port or harbor associated with a seaside located and underdeveloped country.

The smaller boat 164 is capable of adequately towing a number of the offloaded containers 154, 156, 158, et seq., into a remote harbor (not shown) or other suitable dockside location, such as where the containers can be successively uncoupled and lifted out of the water by a suitable crane structure similar to that shown at 160 in reference to the container ship in FIG. 17. Owing to the overall lightweight nature of the container construction, the total weight of the container and interiorly held cargo is further typically such that it will not suitably overburden the lifting capabilities of the crane, forklift, or like device.

Having described my invention, other and additional embodiments will become apparent to those skilled in the art to which it pertains, and without deviating from the scope of the appended claims.

I claim:

1. A cargo carrying enclosure, comprising:
a plurality of panels, each exhibiting a specified two-dimensional shape and thickness, said panels being interconnected along adjoining edges to assemble a three dimensional article holding enclosure;
each of said panels further comprising an inner and structurally supporting substrate around which is three dimensionally molded a plasticized material, said plasticized material defining each of exterior and interior panel surfaces, said substrate further comprising a network of elongated and interconnecting metal members, said plasticized material further comprising a powder impression molded material, an aggregate entrained into said powder impression material including at least one of glass, pebbles/rocks, ceramic, and wood.

2. The enclosure as described in claim 1, said structural substrate associated with each panel comprising at least one of a network of elongated and interconnecting steel and aluminum members.

3. The enclosure as described in claim 1, further comprising a plurality of hinges associated with said adjoining edges of said panels, each of said hinges including a removable pin inserting within a series of matingly aligning sleeve portions established along aligning edges of succeeding panels and in order to convert said enclosure from an assembled configuration to a disassembled and stackable configuration.

4. The enclosure as described in claim 1, further comprising a top panel, a bottom panel, first and second side panels and first and second end panels.

5. The enclosure as described in claim 1, further comprising a plurality of line securing eyelet portions associated with perimeter defining edge locations of at least a top panel of said cargo enclosure.

6. The enclosure as described in claim 1, said enclosure defining a specified shape and size and being supported upon a buoyant freight barge.

7. The enclosure as described in claim 6, said freight barge exhibiting a specified shape and size with a flat bottom and being constructed of an expandable and powder impression molded material.

8. The enclosure as described in claim 7, said freight barge further exhibiting first and second pivotally adjustable end flaps.

9. The enclosure as described in claim 1, said cargo carrying enclosure exhibiting an elongated and three-dimensional rectangular configuration comprising assembleable top, bottom, first and second side and first and second end panels.

10. The enclosure as described in claim 9, said cargo carrying enclosure further comprising insulating panels, a chiller unit communicating a refrigerant to said cargo enclosure.

11. A cargo carrying enclosure, comprising:
a plurality of panels, each exhibiting a specified two-dimensional shape and thickness, said panels being interconnected along adjoining edges to assemble a three dimensional article holding enclosure;
each of said panels further comprising an inner and structurally supporting metal substrate, around which is molded in three dimension a powderized thermoplastic resin material into which is entrained a loose aggregate reinforcing material including at least one of glass, pebble, rock, ceramic and wood, said resin material defining each of exterior and interior panel surfaces; and
a plurality of hinges associated with said adjoining edges of said panels, each of said hinges including a pin inserting within a series of matingly aligning sleeve portions to convert said enclosure from said assembled configuration to a spaced reducing and disassembled configuration.

12. A cargo carrying enclosure, comprising:
a plurality of panels, each exhibiting a specified two-dimensional shape and thickness, said panels being interconnected along adjoining edges to assemble a three dimensional article holding enclosure;
each of said panels further comprising an inner and structurally supporting metal substrate, around which is molded in three dimension a powderized thermoplastic resin material into which is entrained a loose aggregate reinforcing material including at least one of glass, pebble, rock, ceramic and wood, said resin material defining each of exterior and interior surfaces for each panel; and
biasingly interconnecting and overlapping surfaces associated with mating locations of each of said panels for creating a buoyant and water tight cargo holding enclosure, a lengthwise extending recess defined within and along each of a plurality of inner facing edge surfaces of selected container panels, bulbous projecting and likewise extending portions extending, along opposing facing and inner surfaces of further selected container panels for engagement along all of the sides and ends of the container in an assembled configuration.

13. The enclosure as described in claim 12, further comprising a pair of lengthwise extending recesses defined along inner selected surfaces of said first selected panels, first and second projecting portions associated said further selected panels.

14. The enclosure as described in claim 12, said buoyant cargo holding container exhibiting a specified shape and size and further comprising first and second end mounted and pivotally adjustable end flaps.

15. The enclosure as described in claim 12, further comprising a plurality of towable containers supported upon a body of water and interconnected by couplings extending from opposing ends associated with each of said containers.

* * * * *